(12) United States Patent
Storm (10) Patent No.: US 7,177,367 B2
(45) Date of Patent: Feb. 13, 2007

(54) METHOD FOR BIT ASSIGNMENT AND FINE GAIN SETTING IN A MULTI-CARRIER COMMUNICATIONS SYSTEM

(75) Inventor: Andrew Storm, Hawthorn (AU)

(73) Assignee: Bandspeed, Inc., Austin, TX (US)

(*) Notice: Subject to any disclaimer, the term of this patent is extended or adjusted under 35 U.S.C. 154(b) by 871 days.

(21) Appl. No.: 10/057,082

(22) Filed: Jan. 25, 2002

(65) Prior Publication Data

US 2002/0126766 A1   Sep. 12, 2002

Related U.S. Application Data (60) Provisional application No. 60/264,349, filed on Jan. 25, 2001.

(51) Int. Cl.
  *H04L 27/04* (2006.01)
  *H04L 23/02* (2006.01)
(52) U.S. Cl. .................................. 375/295; 375/261
(58) Field of Classification Search ................ 375/295, 375/296, 260, 344, 254, 241, 261; 704/229, 704/500; 324/326, 244, 226, 327
  See application file for complete search history.

(56) References Cited

U.S. PATENT DOCUMENTS

| | | | |
|---|---|---|---|
| 5,822,374 A | 10/1998 | Levin | |
| 5,903,608 A | 5/1999 | Chun | |
| 6,122,247 A | 9/2000 | Levin et al. | |
| 6,128,348 A | 10/2000 | Kao et al. | |
| 6,134,274 A * | 10/2000 | Sankaranarayanan et al. | 375/295 |
| 6,292,515 B1 | 9/2001 | Kao et al. | |
| 6,704,367 B1 * | 3/2004 | Wang et al. | 375/260 |
| 6,829,307 B1 | 12/2004 | Hoo et al. | |
| 2002/0044597 A1 * | 4/2002 | Shively et al. | 375/222 |

FOREIGN PATENT DOCUMENTS

| EP | 0 753 948 A1 | 1/1997 |
|---|---|---|
| WO | WO 99 16224 A1 | 4/1999 |

OTHER PUBLICATIONS

"A Practical Discrete Multitone Transceiver Loading Algorithm for Data Transmission over Spectrally Shaped Channels", Peter S. Chow, John M. Cioffi and John A.C. Bingham, IEEE Transactions on Communications, Feb./Apr. 1995, vol. 43, No. 2/4, part 2, p. 773-775.
PCT/US 02/02299 International Search Report, Jul. 23, 2002.
PCT/US 02/02294 International Search Report Jul. 23, 2002.

* cited by examiner

*Primary Examiner*—Khai Tran
(74) *Attorney, Agent, or Firm*—Hickman Palermo Truong & Becker LLP; Edward A. Becker (57) ABSTRACT

Embodiments of the invention provide for assigning bits to a discrete multi-tone modulation communications system. In an embodiment, one or more channels in the plurality of channels are assigned a number of bits based on a performance characteristic of that channel. One or more channels in the plurality of channels may also be assigned a gain value based on the performance characteristic of that channel.

80 Claims, 6 Drawing Sheets

METHOD FOR BIT ASSIGNMENT AND FINE GAIN SETTING IN A MULTI-CARRIER COMMUNICATIONS SYSTEM

RELATED APPLICATIONS

This application claims priority from U.S. Provisional Patent Application No. 60/264,349, entitled "A METHOD FOR BIT ASSIGNMENT AND FINE GAIN SETTING IN A MULTICARRIER COMMUNICATIONS SYSTEM," filed Jan. 25, 2001, and naming Andrew Storm as inventor. The contents of the aforementioned priority application are hereby incorporated by reference in their entirety for all purposes.

FIELD OF THE INVENTION

The present invention relates to multi-carrier communications system, and more specifically, to an approach for bit assignment and fine gain setting in a multi-carrier communications system.

BACKGROUND OF THE INVENTION

There is a continuing need for higher performance digital data communications systems. Perhaps nowhere is this need more evident than on the worldwide packet data communications network now commonly referred to as the "Internet." On the Internet, the "richness" of content is constantly increasing, requiring an ever-increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

For several reasons, significant efforts are being made to utilize conventional twisted pair telephone lines to provide high-speed digital data transmission. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as ADSL, G.Lite and VDSL, have been developed for providing high-speed digital transmission over conventional twisted pair telephone lines.

Recent standards for digital subscriber line services such as ADSL and G.Lite use discrete multi-tone modulation (DMT) to implement multi-carrier communications systems. DMT is also under consideration for Very high speed Digital Subscriber Line (VDSL) services. By splitting the available bandwidth into a number of independently operating, narrow band tones, alternatively referred to as "channels" herein, such systems achieve high performance over channels with widely varying spectral characteristics. Each tone effectively operates as a (Quadrature Amplitude Modulation) QAM system. The DMT transmitter splits the input data stream into a number of sub-streams, and encodes each sub-stream into a sequence of points in a QAM constellation. The maximum number of bits that may be assigned to each tone is determined by the prevailing signal to noise ratio (SNR) on that tone.

In a QAM system with a constellation $C_b$ consisting of $2^b$ points at odd integer values (n, m), scaled by a factor d, and with additive Gaussian noise having power $\sigma^2$, the symbol error probability is given by $P_e=4Q(z)$ with $z=\sqrt{2}d/(\gamma\sigma)$. The number $\gamma$ is called the margin and the function Q is the tail area of the standard normal distribution:

$$Q(z) = \frac{1}{\sqrt{2\pi}} \int_z^\infty e^{-t^2/2} dt.$$

The margin operates as a guard when there is uncertainty about the operating conditions. If the system is required to operate at a symbol error probability $P_e$ with a margin of $\gamma^2$, then the error probability should be $P_e$ when the noise power is a factor $\gamma^2$ higher than its actual level. In addition, the constellation power is $$p = 2^{-b}d^2 \sum_{C_b}(n^2+m^2) = \frac{2}{3}d^2 c(b).$$

The shape of the constellation determines the function c(b): typically $c(b)=\alpha_b 2^b-1$. For example, if b is even, $c(b)=2^b-1$ for a square constellation with $2^b$ points. Eliminating d yields $$\frac{z^2\gamma^2}{3}c(b) = \frac{p}{\sigma^2} = SNR.$$

This rearranges as $$c(b) = \frac{SNR}{\Gamma}.$$

The quantity $\Gamma=z^2\gamma^2/3$ is called the SNR gap. In the presence of coding, the SNR gap (or equivalently, the margin) is reduced by the amount of the coding gain.

Given an operating margin and a desired symbol error probability, one determines a value for z and thus for $\Gamma$. For example, if $P_e=10^{-7}$ and $\gamma=6$ dB then z=5.45 and $\Gamma=6+9.96=15.96$ dB in the absence of coding. Given a value for the SNR and the SNR gap, one obtains a value for the number of bits that may be transmitted on the tone by inverting $c(b)=SNR/\Gamma$ and rounding b down to the nearest integer. This function may be conveniently implemented in a lookup table.

Determining b in this manner yields the maximum number of bits that can be transmitted on the tone without fine gain adjustment. If an additional gain g is applied at the transmitter, and the SNR is measured without taking account of the gain, then in linear scale $$g^2 \frac{SNR}{\Gamma} = c(b).$$

Alternatively, in logarithmic scale $$g + SNR - \Gamma = c(b).$$

Given values for the number of bits b and the gain g, this equation determines the value of the SNR gap and thus the probability of a symbol error.

Conventional approaches attempt to minimize the variation in the probability of error across tones. This would be a trivial task if the gain on each tone could be arbitrarily chosen. However, system power constraints limit the aggregate gain across all channels, and communications standards sometimes impose further constraints on the individual gains. There may also be constraints on the number of bits. For example, there may be a minimum and a maximum value specified for the number of bits on each tone, and the total number of bits may be constrained to be a multiple of eight if information is transmitted in bytes. Also, a telecommunications provider may sell a service at a rate much less than the carrying capacity of the channel. In this case the total number of bits is specified in advance. Based on the foregoing, it is desirable to assign bits and gains to tones to maximize margins, while minimizing variations in margins between tones.

SUMMARY OF THE INVENTION

According to one embodiment of the invention, a specified number of bits may be assigned to channels of a discrete multi-tone modulation communications system. A portion of the specified number of bits may be assigned to one or more of the channels based on a performance characteristic of that channel.

According to another embodiment, a performance characteristic is identified for channels of a discrete multi-tone modulation communications system. An initial number of bits may be assigned for each channel in an active set of channels in the communications system. The initial number of bits for the active channels may be determined using a performance characteristic of that channel. An aggregate total of the bits that can be assigned to the set of active channels may be reduced so that the set aggregate total of bits is less than or equal to a specified number of bits for the discrete multi-tone modulation communications system.

In an embodiment, one or more channels in a plurality of channels are assigned a number of bits based on a performance characteristic of that channel. One or more channels in the plurality of channels may also be assigned a gain value based on the performance characteristic of that channel.

BRIEF DESCRIPTION OF THE DRAWINGS

Embodiments of the inventions are illustrated by way of example, and not by way of limitation, in the figures of the accompanying drawings and in which like reference numerals refer to similar elements.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects of the invention are described hereinafter in the following sections: 1) Overview; 2) Initial Bit Assignment And Bit Adjustment; 3) Fine Gain Assignment; 4) Identifying Dormant And Inactive Channels; 5) Communications system For Bit Assignment and Fine Gain Value Assignment; and 6) Implementation Systems.

1.0 Overview

Embodiments of the invention provide for assigning a number of bits and a fine gain value to each channel of a multi-carrier communications system.

In describing embodiments of the invention, certain assumptions and notation conventions are used to describe embodiments of the invention. Some of these assumptions and conventions are provided below.

Tones in a multi-carrier system are numbered from 0 to N−1.

A multi-carrier communications system may have active channels and inactive channels. Some inactive channels may be dormant channels. Active channels are assumed to always carry data, unless the channel fails. The set of active tones (defined to be those carrying a non-zero number of bits) is denoted by A, and the set of dormant tones (those carrying zero bits but having non-zero gain) is denoted by D. The purpose of the dormant tones is to serve as possible carriers of data during operation. That is, during operation tones may be classified as active or dormant. Inactive channels are those that are unworthy for data carriage. As such, inactive channels carry no data and have zero gain.

The signal to noise ratio on channel k is $SNR_k$. This is assumed to be an actual measured SNR. For purposes of explanation, the method of measuring the SNR is not described here and the invention is not limited to any particular approach for determining the SNR. It is assumed that the SNR does not include the fine gain factor.

The minimum number of bits that may be carried on an active channel is $b_{min}$, and the maximum number is $b_{max}$, where $0 < b_{min} < b_{max}$. An inactive channel is indicated by $b_k = 0$.

The minimum value of the gain on an active channel is $g_{min}$, and the maximum value is $g_{max}$, where $0 < g_{min} < 1 < g_{max}$. The gain on an inactive channel may be set to 0.

Certain embodiments of the invention may be described in terms of mathematical relationships, with some suggested implementations. The mathematical relationships are intended to provide specific, illustrative examples for implementing embodiments of the invention.

2.0 Initial Bit Assignment and Bit Adjustment

Figure 1:
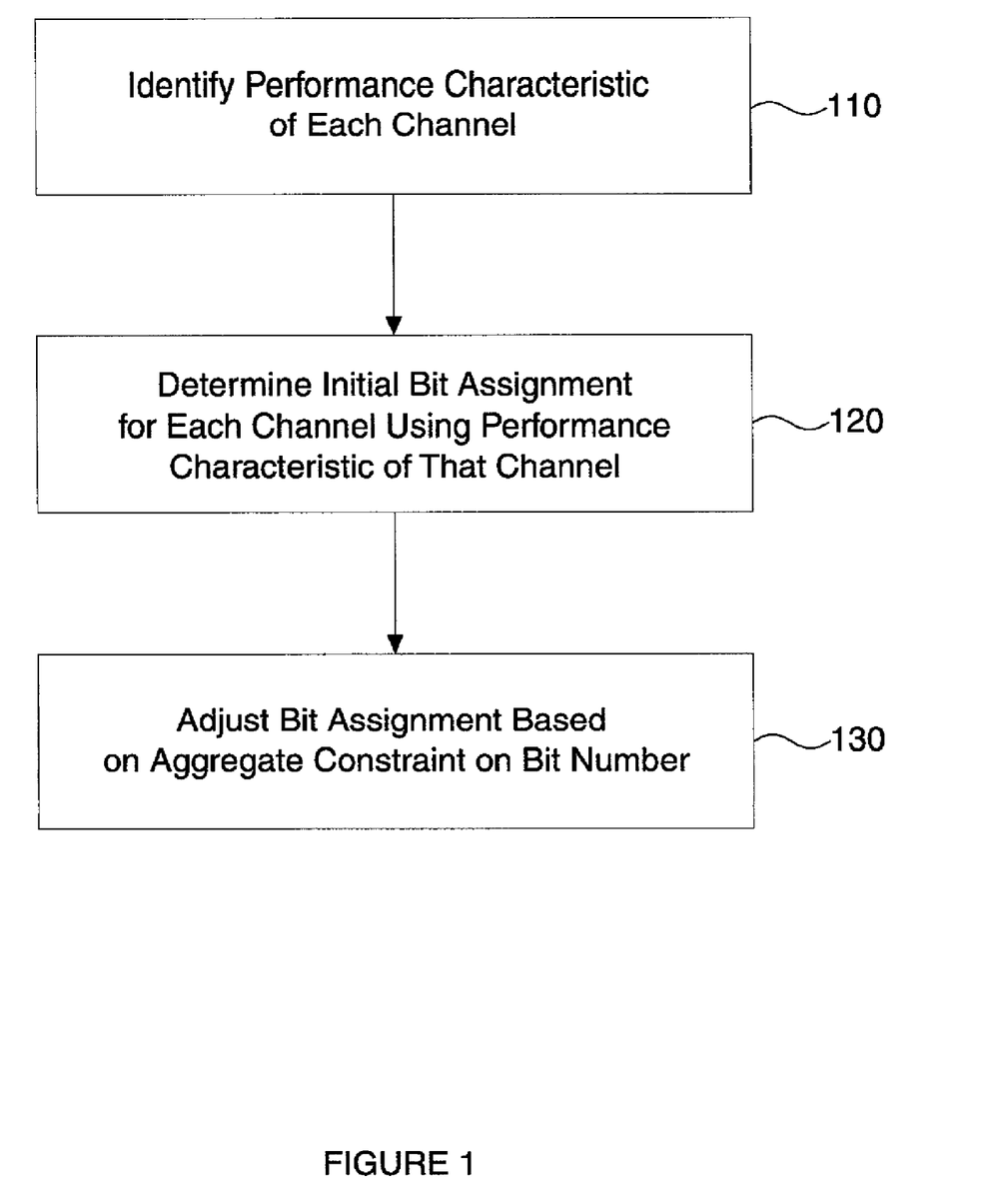
FIG. 1 illustrates a method for bit assignment and adjustment in a multi-carrier communications system.

FIG. 1 illustrates a method for bit assignment and adjustment in a multi-carrier communications system, according to an embodiment of the invention. In particular, embodiments of the invention provide for assigning bits to channels of a multi-carrier system based on each individual channel's performance capabilities. In addition, other embodiments provide that each channel's bit assignments may be adjusted to satisfy the total number of bits, and/or the individual number of bits on each channel.

In step 110, a performance characteristic is identified for each channel in the communications system. According to one embodiment, the performance characteristic that is used for each channel is the signal to noise ratio (SNR). For purpose of determining an initial bit assignment, the SNR for each channel is assumed to be an actual measured value.

In step 120, an initial bit assignment is determined for each channel using the performance characteristic of that channel. The initial bit assignment of a channel corresponds to an allowable number of bits that can be assigned to that channel, given a probability of symbol error. In one embodiment, the initial bit assignment corresponds to a maximum number of bits that can be carried on a channel.

The initial bit assignment may be determined by a procedure that uses the constellation function c(b) of the channel. An upper bound limit is identified for the constellation function of each channel $c(b_k)$ based on a performance characteristic that channel. In other words, the greatest number of bits that can be carried on the channel without causing $c(b_k)$ to exceed the upper bound is the bit assignment for that channel.

In one embodiment, the performance characteristic is the signal to noise ratio $SNR_k$ of a particular channel. The upper bound limit is determined by $SNR_k$ and a nominal SNR gap $\Gamma$. The nominal SNR gap $\Gamma$ is assumed to be a given of the communications system. For example, the SNR gap $\Gamma$ may be specified by the standard in use for the communications system. The actual SNR gap $\Gamma$ for a given channel may change once bits are assigned to that channel. The actual SNR gap $\Gamma$ may be determined in a manner described with FIG. 2.

The procedure for determining bk may be implemented recursively, using the following relationship:

$$c(b_k) \leq \frac{SNR_k}{\Gamma} < c(b_k + 1). \qquad \text{Equation (1)}$$

As a result of determining bit allocation in this manner, certain channels may be switched off if those channels are determined to not be able to carry the minimum bits defined for that channel. For example, if $SNR_k/\Gamma < c(b_{min})$ then set $b_k = 0$. This means that the channel is designated as being inactive.

Similarly, certain channels may have superior performance characteristic that allows them to carry more bits than allowed by the communications system or its standard. For example, if $c(b_{max}) \leq SNR_k/\Gamma$, then set $b_k = b_{max}$.

In step 130, the number of bits assigned to each channel is adjusted to satisfy an aggregate constraint on the total number of bits that can be carried by the active channels of the communications system. For example, as described with FIG. 2, the total number of bits may be reduced to satisfy some external constraint on the number of bits that the communications system may carry.

Figure 2:
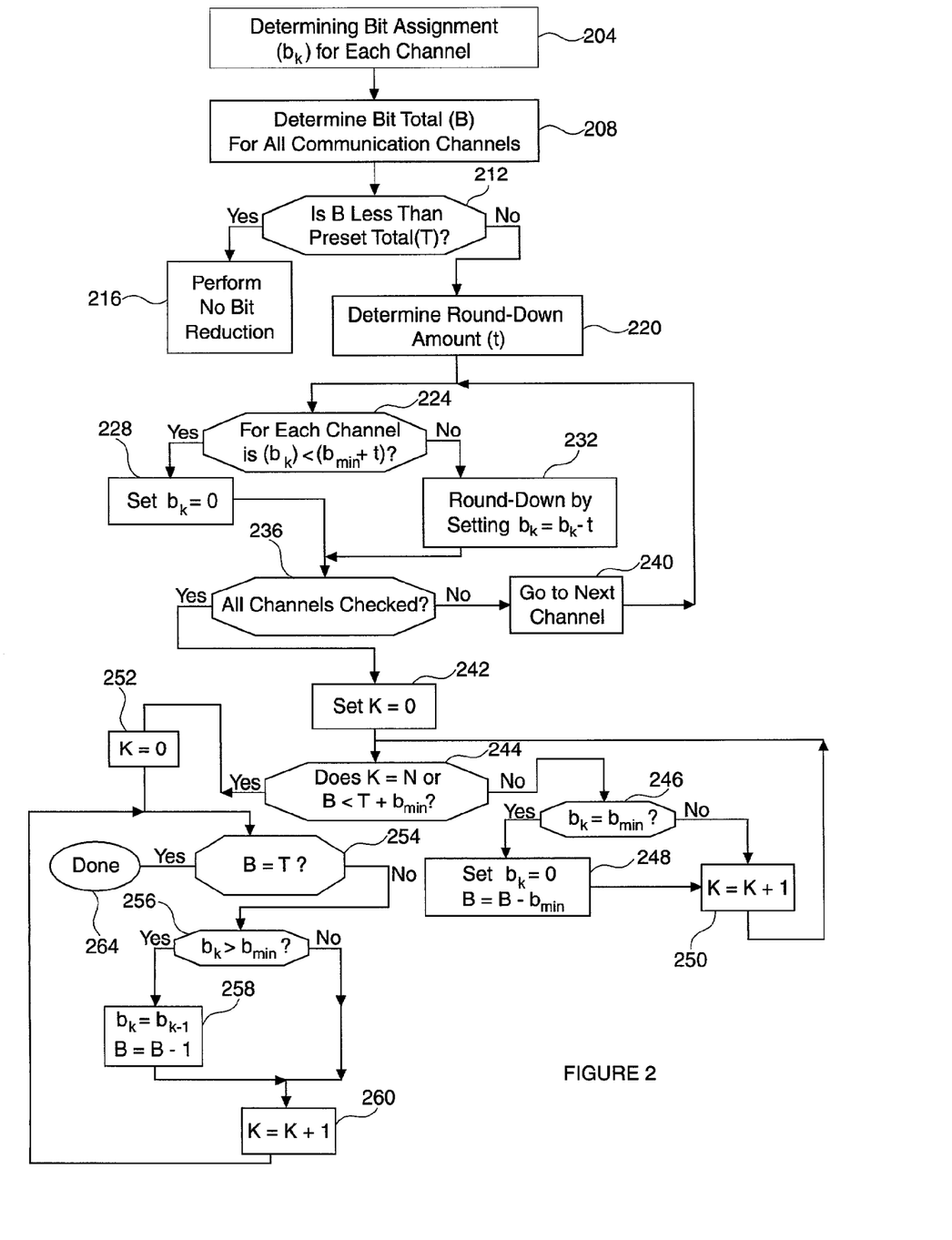
FIG. 2 illustrates an embodiment for reducing the number of bits carried on a channel to satisfy an aggregate limitation on the number of bits that can be carried by the communications system.

FIG. 2 illustrates another embodiment where the number of bits that can be assigned each channel is reduced to satisfy an aggregate limitation on the number of bits that are allowed to be carried by the communications system. For example, the active channels of the communications system may be capable of carrying a certain number of bits (B). But the communications system may be under an external limitation where the number of bits that are allowed to be carried by all the channels cannot exceed a specified number of bits (T), so that T<B. For example, the external limitation may be the result of a third-person telecommunication provider that limits bandwidth for the multi-carrier communications system.

In step 204, a bit assignment $b_k$ is determined for each channel in the communications system. The bit assignment $b_k$ for each channel may be determined using the performance characteristic of that channel, as described with FIG. 1.

In step 208, the total bits B that can be carried by the communications system is determined, given the performance characteristics of the individual channels. This may be represented by the following relationship:

$$B = \sum_{k=0}^{N-1} b_k \qquad \text{Equation (2)}$$

In step 212, a determination is made as to whether the bits that can be assigned to the communications system (B) is less than the specified number of bits (T) are allowed to be carried by the communications system.

If the determination is positive, then step 216 provides that no bit reduction is performed. In other words, the communications system is unable to carry sufficient bits to exceed T. After completion of this step, the method is complete for that communications system.

If the determination in step 216 is negative, then step 220 provides for determining an initial round-down amount (t). In one embodiment, t represents the number of bits that are to be deducted, in a first round-down step, from each of the active channels in the communications system. The initial round down amount may be determined by computing the following:

$$t = \max\{r : \Sigma_{b_k \geq r + b_{min}} b_k - r \geq T\}. \qquad \text{Equation (3)}$$

The value t represents a number of bits that can be deducted from each active channel uniformly. In one embodiment, the value t represents the maximum number of bits that can be deducted from each active channel without the total number of bits falling below T. Restated, the equation states t is a maximum value for r, where r is a threshold bit value, subject to the condition that the sum, for all channels, of the difference between $b_k$ and r is to be greater than or equal to T.

In one embodiment, t may be determined using a procedure. It can be proved that the sum $B = \Sigma_{b_k \geq r + b_{min}} b_k - r$ equals 0 if $r = b_{max} - b_{min} + 1$. If r is decremented by one, the sum increases by one across all channels with $b_k > r + b_{min}$ and by $b_{min}$ across all tones with $b_k=r+b_{min}$. The increment in the sum (in bits) is then the number of channels where $b_k>r+b_{min}$ plus $b_{min}$ multiplied by the number of channels where $b_k=r+b_{min}$. The increment in the sum is then represented by $$\#\{k:b_k>r+b_{min}\}+b_{min}\#\{k:b_k=r+b_{min}\}. \quad \text{Equation (4)}$$

This is determined by counting the relevant tones. Thus, t may be computed by decrementing r and incrementing B until $B \geq T$.

In step 224, a determination is made, for each channel, as to whether the number of bits assigned to that channel are less than $b_{min}$, taking into account that the initial reduction amount t. In other words, for each channel, a determination is made by determining if this equation is true:

$$b_k<t+b_{min} \quad \text{Equation (5)}$$

If this determination is true for a given channel in the communications system, then in step in 228, the bits assigned to that channel are set to zero-i.e., set $b_k=0$.

If the determination of Equation (5) is false for a given channel, then in step 232, the bit assignment for that channel is rounded-down. On channels with $b_k \geq t+b_{min}$ set $b_k$ to $b_k-t$.

Step 236 follows step 228 and step 232. In step 236, a determination is made as to whether each channel in the communications system has been rounded-down, either to zero or by the round-down amount t. If the determination is negative, step 240 identifies the next channel in the communications system to be checked. Step 224 is then repeated.

Once all channels have been round-down, the new bit total B is less than the sum of one bit for each channel having $b_k>b_{min}$ and $b_{min}$ for each channel having $b_k=b_{min}$. In other words, B satisfies the constraint $$T \leq B<T+\#\{k:b_k>b_{min}\}+b_{min}\#\{k:b_k=b_{min}\} \quad \text{Equation (6)}$$

After step 240 is completed, each channel that carried more than zero bits has also undergone a reduction, measured by t. Steps 242–260 make additional bit reductions, with the goal of making bit assignments so that the total number of bits, B, carried by all of the channels, will be equal to T. Accordingly, additional decrements may be made one bit at a time.

In one embodiment, the final bit assignment is made so that active channels in the communications system are adjusted by about the same number of bits. To reduce bits, it may be advantageous to also identify and not use the poorest channels, rather than uniformly decrement all channels without regard to how many bits each channel can carry.

In the next set of steps, channels carrying the minimum number of bits have their bit assignment decremented to 0, until all such channels have been decremented or until the current bit total is less than the desired total plus the minimum number of bits. In step 242, a variable K representing the channel number of the communications system is set to 0. In step 244, a determination is made as to whether either (i) K is equal to the number of channels (N); or (ii) B<T. The determination in step 244 may be true if all channels in the communication system have been iterated through steps 242–260. In addition, the determination in step 244 may be true if the difference between B and T is less than $b_{min}$, meaning further reductions by the decrement amount of $b_{min}$ is too much.

If the determination in step 244 is negative, meaning both conditions in step 244 are false, then a determination is made in step 246 as to whether $b_k=b_{min}$. If this determination is positive, then step 248 provides that $b_k=0$, and B is reduced by $b_{min}$. But if this determination is false, then K is iterated until the channel number condition of step 244 becomes true. As will be described, any further decrement to B will be in single bit iterations.

If the determination in step 244 is true, in step 254 a determination is made as to whether the overall bit total B is equal to T. If the determination in step 254 is true, the method is done in step 264.

If the determination in step 254 is false, then step 256 makes another determination as to whether $b_k>b_{min}$ for the particular channel being checked. If the determination of step 256 is true, step 258 provides that is decremented by one bit, and the overall bit total B is decremented by one. If the determination in step 256 is false, then $b_k=b_{min}$, and the channel cannot be decremented further. In either case, step 260 provides for checking the next channel by iterating K. The portion of the method beginning with step 254 is repeated.

By the time the method initiates step 254, repeated single bit decrements to some or all of the active channels should enable the condition B=T to become true. Therefore, there is no need to track the channels with K, only the need to iterate from one channel to the next until the condition B=T becomes true. Following a true determination to step 256, the method is done in step 264.

3.0 Fine Gain Assignment

Figure 3:
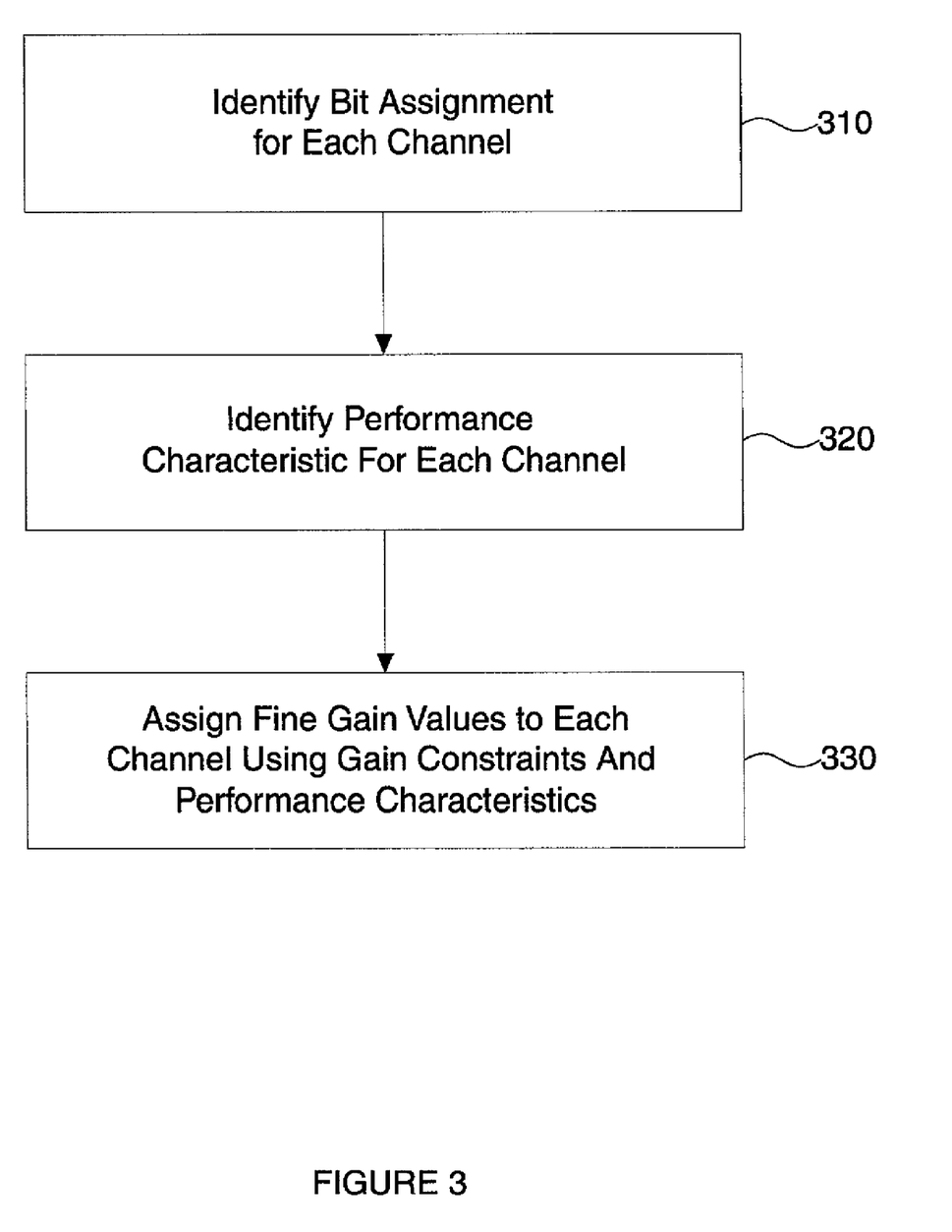
FIG. 3 illustrates an embodiment for assigning fine gain values to channels of the communications system in order to control the margin on each of the channels in the communications system.

FIG. 3 describes an embodiment in which fine gain values are assigned to channels of the communications system in order to control the margin on each of the channels in the communications system. As mentioned elsewhere, the margin is a safety factor used to ensure adequate probability of error in the presence of uncertainty about the operating conditions. For example, when the probability of error is required to be $10^{-7}$ with a 6 db margin, what is meant is that the probability of error should be $10^{-7}$ when the noise is 6 db higher than it actually is.

The fine gain values may be assigned after the bit assignment and/or adjustment to that tone channel, since bit assignment and adjustment will affect the performance characteristic of each channel. Consequently, bit assignments and adjustments will cause the margin (and SNR gap) to vary from channel to channel. For example, rounding of the bit assignments to integer values will cause variations in the margin. In one embodiment, the fine gain values are assigned to each tone channel in order to approximately equalize the margin on each of the channels after the bit assignment and adjustment. This is to ensure approximately equal probability of error on all channels.

The gain assignment may be made subject to one or more constraints specified by the standard used with the communications system. For example, the ADSL standard specifies a minimum and maximum fine gain value for each channel, and a constraint of the aggregate gain on all the channels. In addition, multi-carrier communications systems may be required to control or equalize the margin on each channel.

In step 310, a bit assignment for each channel is determined using performance characteristics of the respective channels, as well as constraints imposed on the communications system. In an embodiment, the bit assignment for each channel may be determined using methods such as described with FIGS. 1 and 2.

In step 320, a performance characteristic of each channel is determined after the bit assignments are made. In an embodiment, the performance characteristic is based on the signal to noise ratio for each channel. Specifically, the margin may be determined for each channel based on the signal to noise ratio, expressed by:

$$\Gamma_k = SNR_k/c(b_k) \forall k \in A \qquad \text{Equation (7)}$$

In this expression the SNR, the constellation power and the SNR gap are in linear scale.

In step 330, the performance characteristic of each channel is used to determine the fine gain values for each channel, subject to gain constraints of the communications system. For example, given an SNR profile $(SNR_k)_{k=0}^{n-1}$ and a bit profile $(b_k)_{k=0}^{N-1}$, embodiments of the invention assign a fine gain value $g_k$ to all active tones under two constraints, one on the individual gains: $g_{min} \leq g_k \leq g_{max} \forall k \in A$ and one on the aggregate gain: $\Sigma_A 10 \log_{10}(g_k^2) \leq 0$.

A truncation function is used to determine fine gain values that satisfy maximum and minimum constraints imposed on individual channels. The truncation function may be represented by the expression $$\zeta(x) = x \text{ if } g_{min}^2 \leq x \leq g_{max}^2, \qquad \text{Equation (8)}$$

$$\zeta(x) = g_{min}^2 \text{ if } x < g_{min}^2 \text{ and}$$

$$\zeta(x) = g_{max}^2 \text{ if } x > g_{max}^2.$$

The truncation function uses fine gain values determined in Equation (6). Fine gain values below $g_{min}$ are rounded up to $g_{min}$, and fine gain values above $g_{max}$ are rounded down to $g_{max}$.

The truncation function is used to compute $\Gamma$ such that $\Sigma_A 10 \log_{10}\zeta(\Gamma/\Gamma_k)=0$. A procedure to compute the required value for $\Gamma$ is as follows. First let $\Gamma_{min} = \min\{\Gamma_k : k \in A\}$ and $\Gamma_{max} = \max\{\Gamma_k : k \in A\}$. The function $S(\Gamma) = \Sigma_A 10 \log_{10}\zeta(\Gamma/\Gamma_k)$ is increasing and continuous, with $S(\Gamma_{min}) \leq 0$ and $S(\Gamma_{max}) \geq 0$, so there exists a value for $\Gamma$ between $\Gamma_{min}$ and $\Gamma_{max}$ with $S(\Gamma)=0$. For $k \in A$ define the lower break points $l_k = g_{min}^2 \Gamma_k$ and the upper break points $u_k = g_{max}^2 \Gamma_k$, and let $m(\Gamma) = \#\{k \in A : l_k < \Gamma\}$ and $n(\Gamma) = \#\{k \in A : u_k \leq \Gamma\}$. The derivative $S'(\Gamma)$ is piecewise continuous, and is given by the following:

$$S'(\Gamma) = \frac{10}{\ln 10} \frac{1}{\Gamma}(m(\Gamma) - n(\Gamma)). \qquad \text{Equation (9)}$$

Order the upper and lower breakpoints collectively as . . . $a_k \square a_{k+1}$ . . . Then the increment in S between two consecutive breakpoints a<b is, for a<$\Gamma$<b, so that:

$$S(b)-S(a)=(10\log_{10}(b)-10\log_{10}(a))(m(\Gamma)-n(\Gamma)). \qquad \text{Equation (10)}$$

After computing S(a) at an initial breakpoint a, one may compute the value at another breakpoint by counting breakpoints and incrementing S appropriately. Proceed to find breakpoints a<b with $S(a) \leq 0 < S(b)$. The required value for $\Gamma$ is given by:

$$10\log_{10}(\Gamma) = 10\log_{10}(a) - \frac{S(a)}{m(\Gamma) - n(\Gamma)}. \qquad \text{Equation (11)}$$

After applying the gain to a channel, the resulting SNR gap will be $\Gamma_{2k} = g_k^2 \Gamma_k = \zeta(\Gamma/\Gamma_k)\Gamma_k$. If $\Gamma_k < \Gamma/g_{max}^2$ then $\Gamma_{2k} = g_{max}^2 \Gamma_k$, and as $g_{max}^2 > 1$, the procedure always results in an improvement in the minimum SNR gap. In addition, $\Gamma_{2k} = \Gamma$ for all tones with $\Gamma/g_{max}^2 \leq \Gamma_k \leq \Gamma/g_{min}^2$, so the gaps are equalized on the majority of tones.

4.0 Identifying Dormant and Inactive Channels

According to embodiments of the invention, dormant and inactive channels are identified based on the performance characteristic of that channel. Dormant channels may carry data if one of the active channels fails. As such, it is desirable to identify some channels as dormant in order to assign non-zero fine gain values to those channels. Inactive channels are too poor to carry data. No fine gain values are assigned to these channels.

Figure 4:
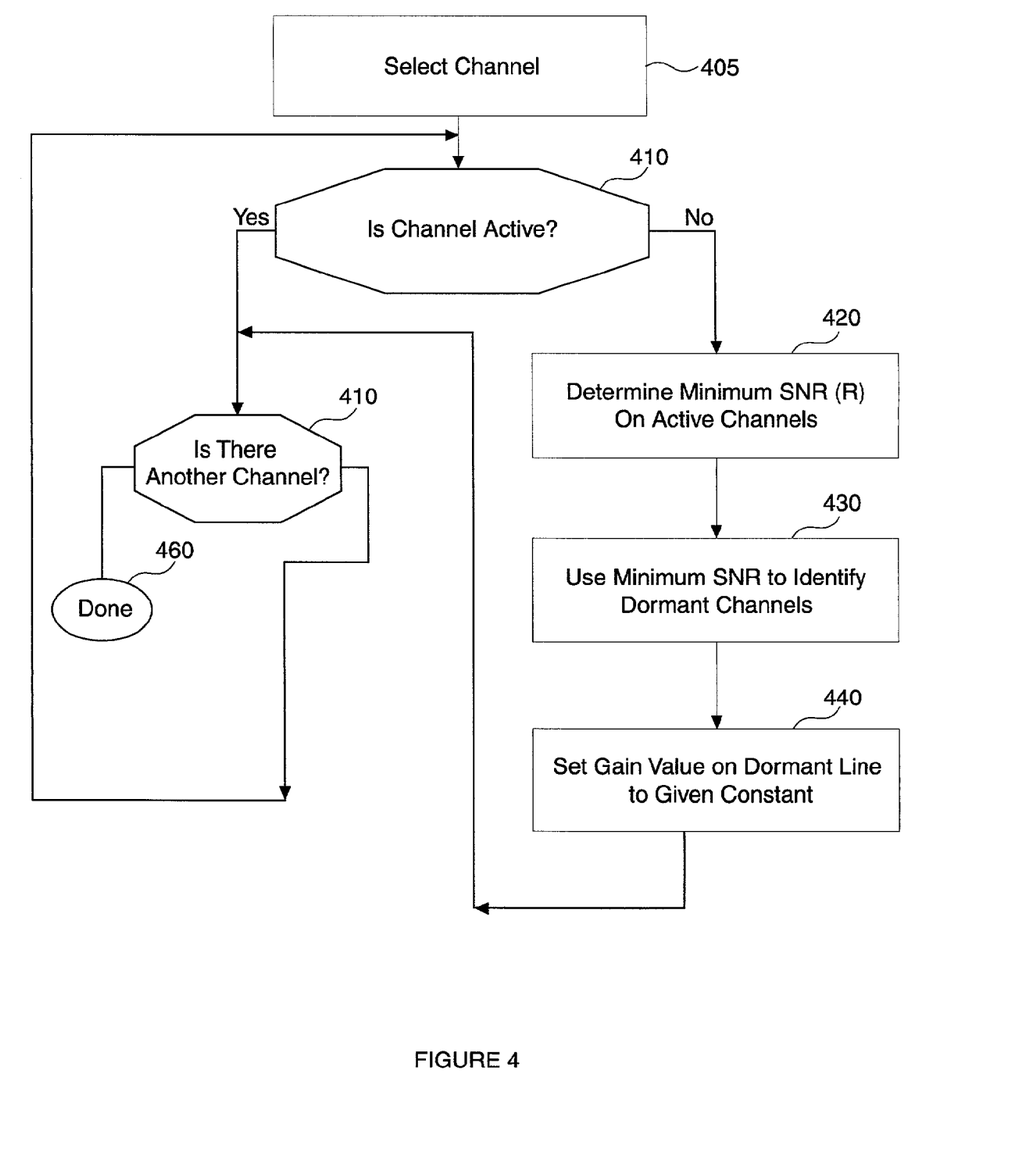
FIG. 4 illustrates a method for determining inactive tones and dormant tones, under an embodiment of the invention.

FIG. 4 illustrates a method for determining inactive tones and dormant tones, according to an embodiment of the invention. In step 405, a channel is selected from the communications system.

In step 410, a determination is made as to whether the selected channel is active or inactive. At this point, inactive channels includes dormant channels.

If the determination in step 410 is negative, step 420 provides that the minimum SNR on the active channels are identified, as expressed by the relationship:

$$R = \min\{SNR_k : k \in A\} \qquad \text{Equation (12)}$$

Step 430 identifies the dormant channels using the minimum SNR. In an embodiment, the dormant channels may be defined by the relationship:

$$D = \{k \in T : b_k = 0 \text{ \& } SNR_k > R - \Delta\} \qquad \text{Equation(13)}$$

The term $\Delta$ is a given positive value and $SNR_k$, R and $\Delta$ are in log scale (i.e. in dB). For example, $\Delta$ may be 6 dB.

Once dormant channels are identified, step 440 provides that the gain values on the dormant channels are set to a given constant, as shown by the expression $$\text{Set } g_k = 1 \forall k \in D. \qquad \text{Equation (14)}$$

The relevant standard may determine or influence the gain value of the dormant channels.

A method such as described with FIG. 4 may check each channel of the communications system individually. Accordingly, if the determination of step 410 is negative, step 450 determines if there are other unchecked channels. Step 450 is also performed after completion of step 440. If the determination is that other unchecked channels exist, step 405 is repeated. Once the determination of step 450 is that no unchecked channels remain, the method is completed in step 460.

5.0 Communications System for Bit Assignment and Fine Gain Value Assignment

Figure 5:
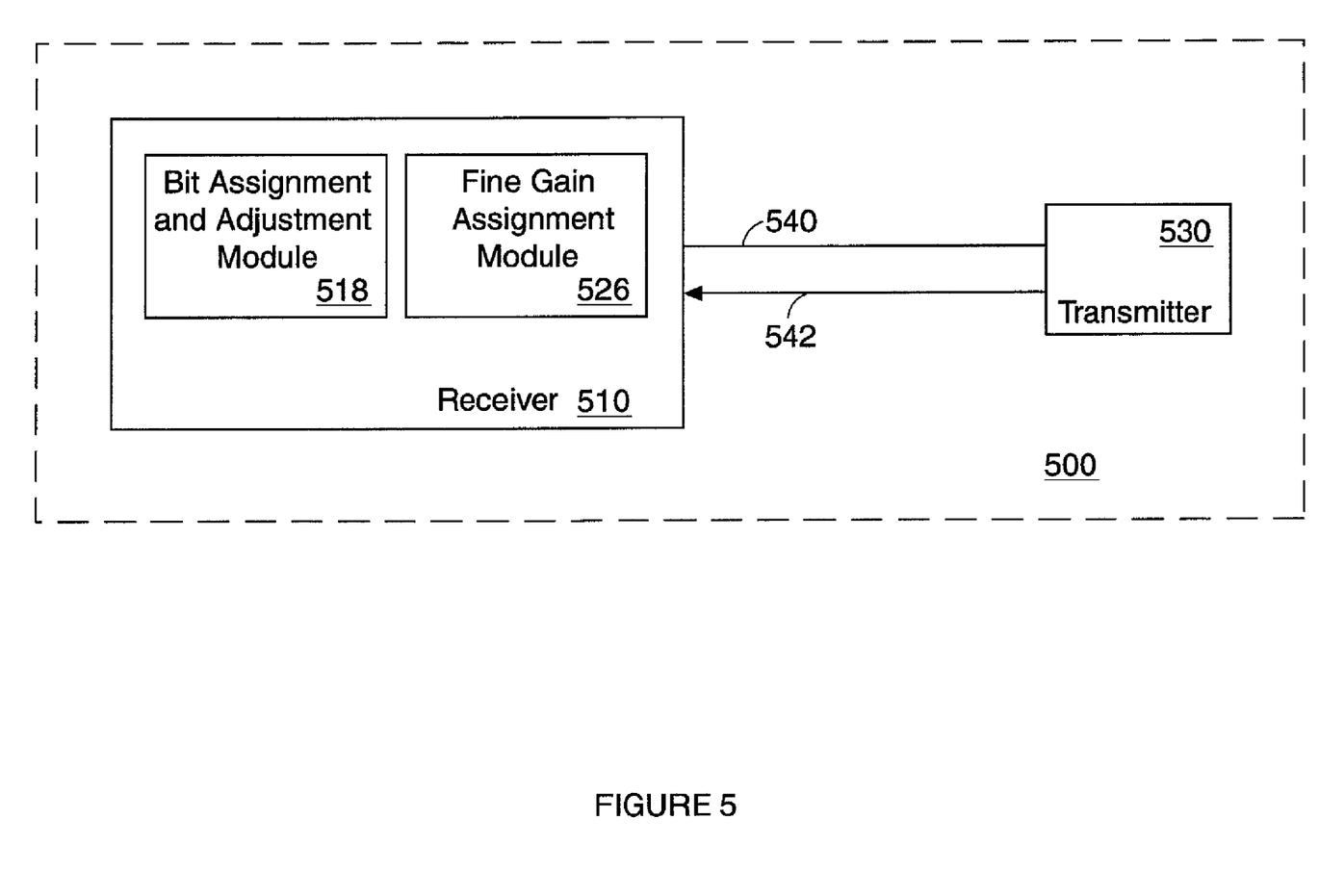
FIG. 5 illustrates a communications system for bit and fine gain value assignment, under an embodiment of the invention.

FIG. 5 depicts a communications system for bit assignment and fine gain value assignment, according to an embodiment of the invention. In an embodiment, FIG. 5 depicts a discrete multi-tone modulation (DMT) communications system, such as provided by DSL services. Specific examples of such systems include ADSL and G.Lite systems.

As shown by FIG. 5, a communications system 500 includes a receiver 510 coupled to a transmitter 530 via a communication medium 540. The components of system 500 are shown in FIG. 5 for illustrative purposes. Communications system 500 may include several transmitters and receivers and other components.

The communication medium 540 may carry discrete, DMT signals, as used in DSL communications systems. Typically, the communication medium 540 includes one or more twisted-pair telephone wires. The communication medium 540 includes a control channel 542.

In an embodiment, receiver 510 includes a bit assignment and adjustment module 518, and a fine gain assignment module 526. As used herein, a module includes a program, a subroutine, a portion of a program, a software component or a hardware component capable of performing a stated task or function. A module can exist on a hardware component such as a server independently of other modules, or a module can exist with other modules on the same server or client terminal, or within the same program.

In one embodiment, receiver 510 uses data carried on communication medium 540 to make bit assignments, adjustments, and set fine gain values, using the respective modules. The information is signaled back to transmitter 530 via control channel 542. The transmitter then implements the bit assignments, adjustments, and fine gain values.

The bit assignment and adjustment module 518 is configured to implement a method such as described with FIG. 1. In another embodiment, bit assignment and adjustment module 518 is configured to implement a reduction process to reduce bits carried on all of the tone channels, in order to satisfy some external constraint. Accordingly, bit assignment and adjustment module 518 may be configured to implement a method such as described herein and illustrated in FIG. 2.

The fine gain assignment module 526 may assign fine gain values to channels of the communications system in order to ensure the channels have a particular performance characteristic, either individually or in the aggregate. In one embodiment, the fine gain assignment module 526 is configured to set fine gain values based on specific maximum, minimum, and aggregate gain constraints. For example, fine gain assignment module 526 may be configured to implement a method such as described herein and illustrated in FIG. 3.

Additionally, bit assignment module 518 and fine gain assignment module 526 may cooperate to identify inactive channels and dormant channels, as described with FIG. 4.

Other embodiments of the invention may use similar configure receiver 510, or other communications devices, in order to implement functionality described with FIGS. 1–4.

Bit assignment and adjustment module 518 and fine gain assignment module 526 may be integrated into receiver 510 as described and depicted herein, or alternatively, may be implemented external to receiver 510, for example as a stand alone mechanism. As another example, bit assignment and adjustment module 518 and fine gain assignment module 526 may be distributed on both receiver 510 and transmitter 530.

6.0 Implementation Systems

The approach for assigning bits and fine gain values to channels of a DMT communications system may be implemented in a wide variety of network types and contexts and the invention is not limited to any particular implementation or context.

Figure 6:
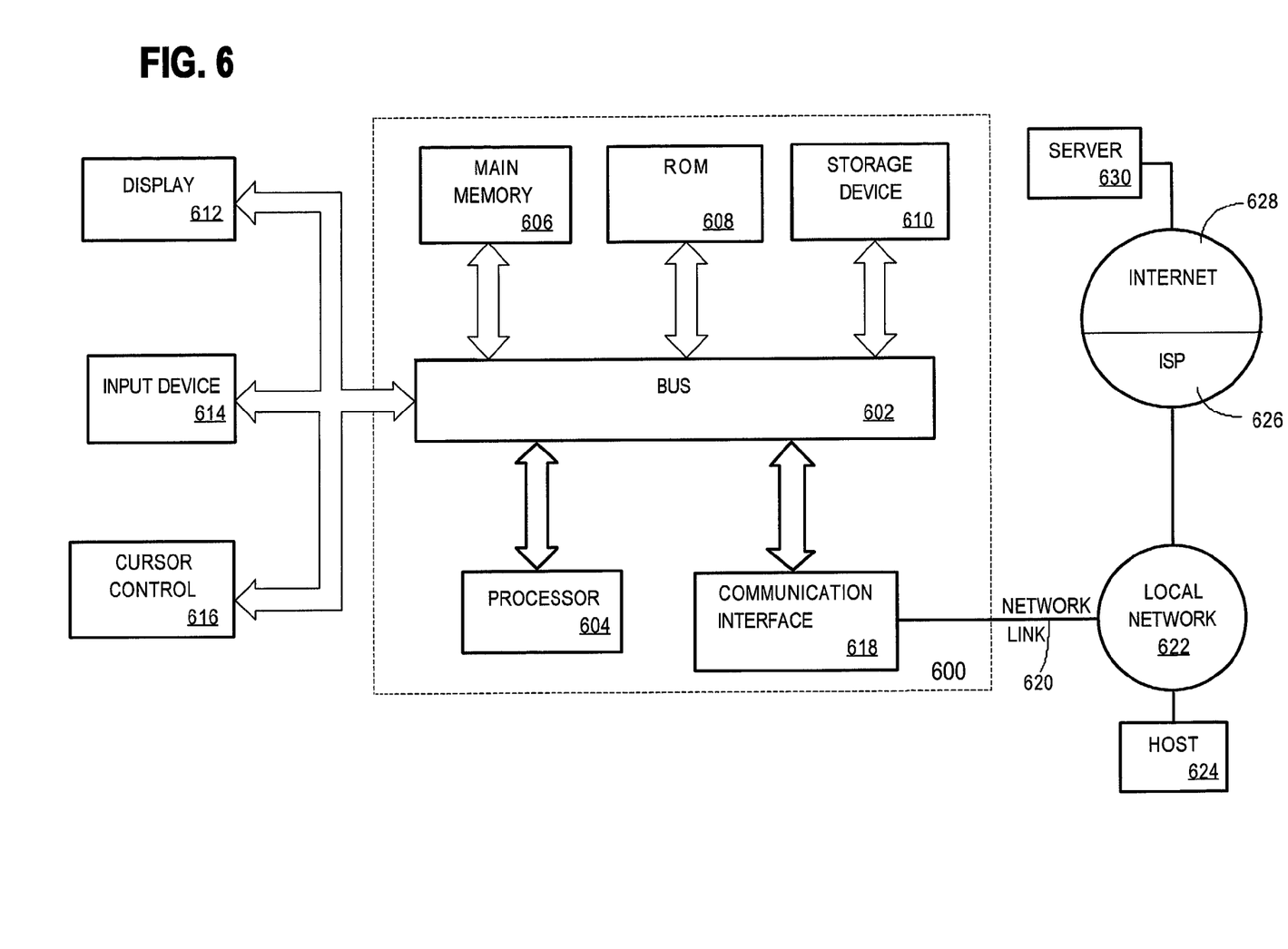
FIG. 6 is a block diagram of a computer system for use with an embodiment of the invention.

FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Embodiments of the invention relate to the use of computer system 600 for assigning bits and fine gain values to channels of a DMT communications system. According to one embodiment, assigning bits and fine gain values to channels of a DMT communications system is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for assigning bits and fine gain values to channels of a DMT communications system as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for assigning bits to a plurality of channels in a discrete multi-tone modulation communications system, the method comprising:

assigning, to each of one or more channels in a plurality of channels, at least a portion of a specified number of bits based on a performance characteristic of each of the one or more channels;

determining an allowable number of bits that can be carried by each of one or more channels using a signal to noise measurement for each of the one or more channels;

for a first group of channels in the plurality of channels, wherein the allowable number of bits that can be carried by each channel in the first group of channels is less than a characteristic minimum bit value for channels in the discrete multi-tone modulation communications system, reducing the determined allowable number of bits for each channel in the first group of channels to zero; and wherein the specified number of bits satisfies an aggregate constraint on the bits assigned to the plurality of channels, so that a total number of bits assigned to the plurality of channels is equal the specified number of bits.

2. A method as recited in claim 1, wherein assigning at least a portion of a specified number of bits based on a performance characteristic of each of the one or more channels includes assigning at least a portion of the specified number of bits based on a signal to noise characteristic of each of the one or more channels.

3. A method as recited in claim 1, further comprising:

selecting a set of active channels from the plurality of channels;

assigning to each channel in the set of active channels at least a portion of the specified number of bits; and assigning zero bits to each of the plurality of channels not in the active set of channels.

4. A method as recited in claim 3, further comprising using a performance characteristic of each channel in the plurality of channels to select the set of active channels from the plurality of channels.

5. A method as recited in claim 4, wherein using the performance characteristic of each channel in the plurality of channels includes using a signal to noise measurement for each channel in the plurality of channels to select the set of active channels from the plurality of channels.

6. A method as recited in claim 1, further comprising, determining a number of bits that can be carried by each of the one or more channels using a signal to noise measurement for each of the one or more channels, and reducing the determined number of bits that can be carried by each of the one or more channels by an increment bit value so that the total number of bits assigned to the one or more channels is equal to the specified number of bits.

7. A method as recited in claim 6, wherein reducing the determined number of bits that can be carried by each of the one or more channels by an increment bit value includes reducing the determined number of bits that can be carried by each of the one or more channels by an equal amount.

8. A method as recited in claim 6, wherein reducing the determined number of bits that can be carried by each of the one or more channels by an increment bit value includes reducing the determined number of bits that can be carried by each of the one or more channels by an amount that is based on a characteristic minimum and maximum bit value for that channel.

9. A method as recited in claim 1, wherein for a second group of channels in the plurality of channels, the allowable number of bits that can be carried by each channel in a second group of channels is greater than the characteristic minimum bit value, and wherein the method further comprises reducing the number of bits that can be carried by each of the channels in the second group of channels by at least an incremental value.

10. A method as recited in claim 9, wherein the method further comprises reducing the number of bits that can be carried by each of the channels in the second group by at least an incremental value only after reducing the determined allowable number of bits for each channel in the first group to zero.

11. A method as recited in claim 9, wherein the method further comprises reducing the number of bits that can be carried by one or more of the channels in the second group by one until a total number of bits that can be carried by the plurality of channels is equal to the specified number of bits.

12. A method as recited in claim 1, further comprising assigning a gain value to at least some of the plurality of channels based on the performance characteristic of the at least some of the plurality of channels.

13. A method as recited in claim 1, further comprising assigning a gain value to the one or more channels based on the performance characteristic of each channel in the one or more channels so that a margin of each channel in the one or more channels is approximately equal.

14. A method for assigning bits to channels in a discrete multi-tone modulation communications system, the method comprising:
    determining an initial number of bits that can be assigned to each channel in a set of active channels based on the performance characteristic of each channel in the set of active channels;
    identifying, from the set of active channels, a first group of channels and a second group of channels, wherein the initial number of bits that can be assigned to each channel in the first group of channels is less than or equal to the initial number of bits that can be assigned to each channel in the second group of channels; and
    reducing an aggregate number of bits assigned to the set of active channels so as to satisfy an constraint on the aggregate number of bits that can be assigned to the set of active channels by designating one or more channels in the first group of channels to be assigned zero bits.

15. A method as recited in claim 14, wherein reducing an aggregate number of the bits assigned to the set of active channels includes designating one or more channels in the first group of channels to be assigned zero bits until the aggregate number of the bits satisfies the constraint on the aggregate number of bits.

16. A method as recited in claim 14, further comprising determining an initial bit reduction amount for channels in the second group of channels, and wherein reducing an aggregate number of the bits assigned to the set of active channels includes reducing the initial number of bits assigned to one or more channels in the second group of channels by the initial bit reduction amount after designating all of the channels in the first group of channels to be assigned zero bits.

17. A method as recited in claim 16, wherein determining an initial bit reduction amount for channels in the second group of channels includes selecting the initial bit reduction amount so as to not reduce the aggregate number of the bits below a maximum allowable number of bits that satisfies the constraint on the aggregate number of bits.

18. A method as recited in claim 17, wherein selecting the initial bit reduction amount includes selecting the initial bit reduction so as to reduce the aggregate number of the bits to an amount that is equal to or in between the maximum allowable number of bits and a sum of the maximum allowable number of bits and a number of channels in the second group of channels, and wherein reducing an aggregate number of the bits assigned to the set of active channels includes, after reducing the initial number of bits assigned to all of the channels in the second group of channels by the initial bit reduction amount, further reducing the bits assigned to channels in the second group of channels by one until the aggregate number of the bits is equal to the maximum allowable number of bits.

19. A method for assigning gain values to a plurality of channels in a discrete multi-tone modulation communications system, the method comprising assigning, to each channel in the plurality of channels, a gain value based upon a performance characteristic and a specified gain limit for each channel in the plurality of channels.

20. A method as recited in claim 19, further comprising assigning the gain value to each channel in the plurality of channels so that a sum of the gain values assigned to the plurality of channels satisfies a specified aggregate gain limit.

21. A method as recited in claim 19, wherein assigning the gain value to each channel is further based upon a number of bits assigned to channel in the plurality of channels.

22. A method for assigning bits in a discrete multi-tone modulation communications system, the method comprising:
    assigning, to one or more channels in a plurality of channels, a number of bits based on a performance characteristic of each of the one or more channels; and
    assigning to the one or more channels a gain value based on the performance characteristic of each of the one or more channels so as to set a margin for each of the one or more channels to be in a specified range.

23. A method of claim 22, further comprising assigning to the one or more channels the gain value based on the performance characteristic of each of the one or more channels so as to equalize a margin for each of the one or more channels to be about the same.

24. A method of claim 22, further comprising assigning to the one or more channels the gain value based on the performance characteristic of each of the one or more channels so as to satisfy a gain constraint on a maximum and a minimum of the gain value for each of the one or more channels.

25. A method of claim 22, further comprising assigning to the one or more channels the gain value based on the performance characteristic of each of the one or more channels so as to satisfy a gain constraint on an aggregate total of the gain value for each of the one or more channels.

26. A method as recited in claim 22, further comprising assigning to the one or more channels the number of bits based on a signal to noise value for each of the one or more channels.

27. An apparatus comprising:
    a bit assignment and adjustment module communicatively configured to assign a number of bits to each of one or more channels in a plurality of channels; and
    a gain value module communicatively configured to assign to each of the one or more channels a fine gain value based on the performance characteristic of each of the one or more channels so as to set a margin for each of the one or more channels to be in a specified range.

28. The apparatus of claim 27, wherein the gain value module is further configured to assign to the one or more channels the gain value so as to equalize a margin for each of the one or more channels to be about the same.

29. The apparatus of claim 27, wherein the gain value module is further configured to assign to the one or more channels the gain value so as to satisfy a gain constraint on a maximum and a minimum of the gain value for each of the one or more channels.

30. The apparatus of claim 27, wherein the gain value module is further configured to assign to the one or more channels the gain value so as to satisfy a gain constraint on an aggregate total of the gain value for each of the one or more channels.

31. The apparatus of claim 27, wherein the bit assignment and adjustment module is further configured to assign a number of bits to each of one or more channels based on the performance characteristic of each of the one or more channels.

32. The apparatus of claim 27, wherein each performance characteristic is based on a signal to noise ratio for that channel.

33. The apparatus of claim 27, wherein the bit assignment and adjustment module is further configured to determine a number of bits that can be assigned to each of the one or more channels based on the performance characteristic of each of the one or more channels, and to selectively reduce the number of bits that are assigned to each of the one or more channels so that an aggregate bit total satisfies an aggregate constraint for the number of bits that can be assigned to the one or more channels.

34. A computer-readable medium for assigning bits to a plurality of channels in a discrete multi-tone modulation communications system, the computer-readable medium carrying instructions which, when executed by one or more processors, cause the one or more processors to:

assign, to each of one or more channels in a plurality of channels, at least a portion of a specified number of bits based on a performance characteristic of each of the one or more channels;

determine an allowable number of bits that can be carried by each of one or more channels using a signal to noise measurement for each of the one or more channels;

for a first group of channels in the plurality of channels, wherein the allowable number of bits that can be carried by each channel in the first group of channels is less than a characteristic minimum bit value for channels in the discrete multi-tone modulation communications system, reduce the determined allowable number of bits for each channel in the first group of channels to zero; and wherein the specified number of bits satisfies an aggregate constraint on the bits assigned to the plurality of channels, so that a total number of bits assigned to the plurality of channels is equal the specified number of bits.

35. A computer-readable medium as recited in claim 34, wherein instructions for assigning at least a portion of a specified number of bits based on a performance characteristic of each of the one or more channels include instructions for assigning at least a portion of the specified number of bits based on a signal to noise characteristic of each of the one or more channels.

36. A computer-readable medium as recited in claim 34, further carrying instructions for performing the steps of:

selecting a set of active channels from the plurality of channels;

assigning to each channel in the set of active channels at least the portion of the specified number of bits; and assigning zero bits to each of the plurality of channels not in the active set of channels.

37. A computer-readable medium as recited in claim 36, further comprising instructions for using a performance characteristic of each channel in the plurality of channels to select the set of active channels from the plurality of channels.

38. A computer-readable medium as recited in claim 37, wherein instructions for using the performance characteristic of each channel in the plurality of channels include instructions for using a signal to noise measurement for each channel in the plurality of channels to select the set of active channels from the plurality of channels.

39. A computer-readable medium as recited in claim 34, further comprising instructions for determining a number of bits that can be carried by each of the one or more channels using a signal to noise measurement for each of the one or more channels, and instructions for reducing the determined number of bits that can be carried by each of the one or more channels by an increment bit value so that the total number of bits assigned to the one or more channels is equal to the specified number of bits.

40. A computer-readable medium as recited in claim 39, wherein the increment bit value for each of the one or more channels is the same.

41. A computer-readable medium as recited in claim 39, wherein the increment bit value for each channel is determined based on a characteristic minimum and maximum bit value for that channel.

42. A computer-readable medium as recited in claim 34, wherein for a second group of channels in the plurality of channels, the allowable number of bits that can be carried by each channel in a second group of channels is greater than the characteristic minimum bit value, and wherein the computer-readable medium further comprises instructions for reducing the number of bits that can be carried by each of the channels in the second group of channels by at least an incremental value.

43. A computer-readable medium as recited in claim 42, wherein the computer-readable medium further comprises instructions for reducing the number of bits that can be carried by each of the channels in the second group by at least an incremental value only after executing instructions for reducing the determined allowable number of bits for each channel in the first group to zero.

44. A computer-readable medium as recited in claim 42, wherein the computer-readable medium further comprises instructions for reducing the number of bits that can be carried by one or more of the channels in the second group by one until a total number of bits that can be carried by the plurality of channels is equal to the specified number of bits.

45. A computer-readable medium as recited in claim 34, further comprising instructions for assigning a gain value to at least some of the plurality of channels based on the performance characteristic of the at least some of the plurality of channels.

46. A computer-readable medium as recited in claim 34, further comprising instructions for assigning a gain value to the one or more channels based on the performance characteristic of each of the one or more channels so that a margin of each of the one or more channels is approximately equal.

47. A computer-readable medium for assigning a specified number of bits to a discrete multi-tone modulation communications system, the computer-readable medium comprising instructions for performing the steps of:

determining an initial number of bits that can be assigned to each channel in a set of active channels based on the performance characteristic of each channel in the set of active channels;

identifying, from the set of active channels, a first group of channels and a second group of channels, wherein the initial number of bits that can be assigned to each channel in the first group of channels is less than or equal to the initial number of bits that can be assigned to each channel in the second group of channels; and reducing an aggregate number of bits that can be assigned to each channel in the set of active channels so as to satisfy an constraint on the aggregate number of bits for the plurality of channels by designating one or more channels in the first group of channels to be assigned zero bits.

48. A computer-readable medium as recited in claim 47, wherein instructions for reducing an aggregate number of the bits that can be assigned to the set of active channels include instructions for designating one or more channels in the first group of channels to be assigned zero bits until the aggregate number of the bits satisfies the constraint on the aggregate number of bits.

49. A computer-readable medium as recited in claim 47, further comprising instructions for determining an initial bit reduction amount for channels in the second group of channels, and wherein instructions for reducing an aggregate number of the bits that can be assigned to the set of active channels include instructions for reducing the initial number of bits that can be assigned to one or more channels in the second group of channels by the initial bit reduction amount after designating all of the channels in the first group of channels to be assigned zero bits.

50. A computer-readable medium as recited in claim 49, wherein instructions for determining an initial bit reduction amount for channels in the second group of channels include instructions for selecting the initial bit reduction amount so as to not reduce the aggregate number of the bits below a maximum allowable number of bits that satisfy the constraint on the aggregate number of bits.

51. A computer-readable medium as recited in claim 50, wherein instructions for selecting the initial bit reduction amount include instructions for selecting the initial bit reduction so as to reduce the aggregate number of the bits to an amount that is equal to or in between the maximum allowable number of bits and a sum of the maximum allowable number of bits and a number of channels in the second group of channels, and wherein instructions for reducing an aggregate number of the bits that can be assigned to the set of active channels include, after reducing the initial number of bits that can be assigned to all of the channels in the second group of channels by the initial bit reduction amount, instructions for further reducing the bits that can be assigned to channels in the second group of channels by one until the aggregate number of the bits is equal to the maximum allowable number of bits.

52. A computer-readable medium for assigning gain values to a plurality of channels in a discrete multi-tone modulation communications system, the computer-readable medium comprising instructions for assigning, to each channel in the plurality of channels, a gain value based upon a performance characteristic and a specified gain limit for each channel in the plurality of channels.

53. A computer-readable medium as recited in claim 52, wherein a sum of the gain values assigned to the plurality of channels satisfies a specified total gain limit.

54. A computer-readable medium as recited in claim 52, wherein instructions for assigning the gain value to each channel is further based upon a number of bits assigned to each channel in the plurality of channels.

55. A computer-readable medium for assigning bits to a discrete multi-tone modulation communications system, the computer-readable medium carrying instructions which, when executed by one or more processors, cause the one or more processors to perform steps of:

assigning, to one or more channels in a plurality of channels, a number of bits based on a performance characteristic of each of the one or more channels; and assigning to each of the one or more channels a gain value based on the performance characteristic of each of the one or more channels so as to set a margin for each of the one or more channels to be in a specified range.

56. A computer-readable medium of claim 55, further comprising instructions for assigning to the one or more channels the gain value based on the performance characteristic of each of the one or more channels so as to equalize a margin for each of the one or more channels to be about the same.

57. A computer-readable medium of claim 55, further comprising instructions for assigning to the one or more channels the gain value based on the performance characteristic of each of the one or more channels so as to satisfy a gain constraint on a maximum and a minimum of the gain value for each of the one or more channels.

58. A computer-readable medium of claim 55, further comprising instructions for assigning to the one or more channels the gain value based on the performance characteristic of each of the one or more channels so as to satisfy a gain constraint on an aggregate total of the gain value for each of the one or more channels.

59. A computer-readable medium as recited in claim 55, further comprising instructions for assigning to one or more channels the number of bits based on a signal to noise value for each of the one or more channels.

60. An apparatus for assigning bits to a plurality of channels in a discrete multi-tone modulation communications system, the apparatus comprising a bit assignment and adjustment module configured to:

assign, to each of one or more channels in a plurality of channels, at least a portion of a specified number of bits based on a performance characteristic of each of the one or more channels;

determine an allowable number of bits that can be carried by each of one or more channels using a signal to noise measurement for each of the one or more channels;

for a first group of channels in the plurality of channels, wherein the allowable number of bits that can be carried by each channel in the first group of channels is less than a characteristic minimum bit value for channels in the discrete multi-tone modulation communications system, reduce the determined allowable number of bits for each channel in the first group of channels to zero; and wherein the specified number of bits satisfies an aggregate constraint on the bits assigned to the plurality of channels, so that a total number of bits assigned to the plurality of channels is equal the specified number of bits.

61. An apparatus as recited in claim 60, wherein the bit assignment and adjustment module is further configured to assign at least a portion of a specified number of bits based on a performance characteristic of each of the one or more channels by assigning at least a portion of the specified number of bits based on a signal to noise characteristic of each of the one or more channels.

62. An apparatus as recited in claim 60, wherein the apparatus is configured to:
select a set of active channels from the plurality of channels;
assign to each channel in the set of active channels at least a portion of the specified number of bits; and
assign zero bits to each of the plurality of channels not in the active set of channels.

63. An apparatus as recited in claim 62, wherein the apparatus is further configured to use a performance characteristic of each channel in the plurality of channels to select the set of active channels from the plurality of channels.

64. An apparatus as recited in claim 63, wherein the apparatus is configured to use the performance characteristic of each channel in the plurality of channels by using a signal to noise measurement for each channel in the plurality of channels to select the set of active channels from the plurality of channels.

65. An apparatus as recited in claim 60, wherein the bit assignment and adjustment module is further configured to determine a number of bits that can be carried by each of the one or more channels using a signal to noise measurement for each of the one or more channels, and reduce the determined number of bits that can be carried by each of the one or more channels by an increment bit value so that the total number of bits assigned to the one or more channels is equal to the specified number of bits.

66. An apparatus as recited in claim 65, wherein the bit assignment and adjustment module is further configured to reduce the determined number of bits that can be carried by each of the one or more channels by an increment bit value by reducing the determined number of bits that can be carried by each of the one or more channels by an equal amount.

67. An apparatus as recited in claim 65, wherein the bit assignment and adjustment module is further configured to reduce the determined number of bits that can be carried by each of the one or more channels by an increment bit value by reducing the determined number of bits that can be carried by each of the one or more channels by an amount that is based on a characteristic minimum and maximum bit value for that channel.

68. An apparatus as recited in claim 60, wherein for a second group of channels in the plurality of channels, the allowable number of bits that can be carried by each channel in a second group of channels is greater than the characteristic minimum bit value, and wherein the bit assignment and adjustment module is further configured to reduce the number of bits that can be carried by each of the channels in the second group of channels by at least an incremental value.

69. An apparatus as recited in claim 68, wherein the bit assignment and adjustment module is further configured to reduce the number of bits that can be carried by each of the channels in the second group by at least an incremental value only after reducing the determined allowable number of bits for each channel in the first group to zero.

70. An apparatus as recited in claim 68, wherein the bit assignment and adjustment module is further configured to reduce the number of bits that can be carried by one or more of the channels in the second group by one until a total number of bits that can be carried by the plurality of channels is equal to the specified number of bits.

71. An apparatus as recited in claim 60, wherein the apparatus further comprises a gain assignment module configured to assign a gain value to at least some of the plurality of channels based on the performance characteristic of the at least some of the plurality of channels.

72. An apparatus as recited in claim 60, wherein the apparatus further comprises a gain assignment module configured to assign a gain value to the one or more channels based on the performance characteristic of each channel in the one or more channels so that a margin of each channel in the one or more channels is approximately equal.

73. An apparatus for assigning bits to channels in a discrete multi-tone modulation communications system, the apparatus comprising a bit assignment and adjustment module configured to:
determine an initial number of bits that can be assigned to each channel in a set of active channels based on the performance characteristic of each channel in the set of active channels;
identify, from the set of active channels, a first group of channels and a second group of channels, wherein the initial number of bits that can be assigned to each channel in the first group of channels is less than or equal to the initial number of bits that can be assigned to each channel in the second group of channels; and
reduce an aggregate number of bits assigned to the set of active channels so as to satisfy an constraint on the aggregate number of bits that can be assigned to the set of active channels by designating one or more channels in the first group of channels to be assigned zero bits.

74. An apparatus as recited in claim 73, wherein the bit assignment and adjustment module is further configured to reduce the aggregate number of the bits assigned to the set of active channels by designating one or more channels in the first group of channels to be assigned zero bits until the aggregate number of the bits satisfies the constraint on the aggregate number of bits.

75. An apparatus as recited in claim 73, wherein the bit assignment and adjustment module is further configured to determine an initial bit reduction amount for channels in the second group of channels, and reduce the aggregate number of the bits assigned to the set of active channels by reducing the initial number of bits assigned to one or more channels in the second group of channels by the initial bit reduction amount after designating all of the channels in the first group of channels to be assigned zero bits.

76. An apparatus as recited in claim 75, wherein the bit assignment and adjustment module is further configured to determine the initial bit reduction amount for channels in the second group of channels by selecting the initial bit reduction amount so as to not reduce the aggregate number of the bits below a maximum allowable number of bits that satisfies the constraint on the aggregate number of bits.

77. An apparatus as recited in claim 76, wherein the bit assignment and adjustment module is further configured to select the initial bit reduction amount by selecting the initial bit reduction so as to reduce the aggregate number of the bits to an amount that is equal to or in between the maximum allowable number of bits and a sum of the maximum allowable number of bits and a number of channels in the second group of channels, and wherein the bit assignment and adjustment module is further configured to reduce the aggregate number of the bits assigned to the set of active channels by, after reducing the initial number of bits assigned to all of the channels in the second group of channels by the initial bit reduction amount, further reducing the bits assigned to channels in the second group of channels by one until the aggregate number of the bits is equal to the maximum allowable number of bits.

78. An apparatus for assigning gain values to a plurality of channels in a discrete multi-tone modulation communications system, the apparatus comprising:

a gain adjustment module configured to assign, to each channel in the plurality of channels, a gain value based upon a performance characteristic and a specified gain limit for each channel in the plurality of channels.

79. An apparatus as recited in claim 78, wherein the gain adjustment module is further configured to assign the gain value to each channel in the plurality of channels so that a sum of the gain values assigned to the plurality of channels satisfies a specified aggregate gain limit.

80. An apparatus as recited in claim 78, wherein the gain adjustment module is further configured to assign the gain value to each channel based upon a number of bits assigned to channel in the plurality of channels.

* * * * *